(12) United States Patent
Ganz et al.

(10) Patent No.: US 8,721,456 B2
(45) Date of Patent: May 13, 2014

(54) INCENTIVIZING PLAYING BETWEEN WEBSITES

(71) Applicant: Ganz, Woodbridge (CA)

(72) Inventors: Howard Ganz, North York (CA); Karl Joseph Borst, Woodbridge (CA)

(73) Assignee: Ganz, Woodbridge, Ontario ( * ) Notice: Subject to any disclaimer, the term of this patent is extended or adjusted under 35 U.S.C. 154(b) by 0 days.

(21) Appl. No.: 13/768,421

(22) Filed: Feb. 15, 2013

(65) Prior Publication Data

US 2013/0217500 A1 Aug. 22, 2013

Related U.S. Application Data

(60) Provisional application No. 61/600,130, filed on Feb. 17, 2013.

(51) Int. Cl.
*A63F 13/00* (2006.01)

(52) U.S. Cl.
USPC .................................. 463/42; 463/31; 463/43

(58) Field of Classification Search
USPC ................................................ 463/25, 31, 42
See application file for complete search history.

(56) References Cited

U.S. PATENT DOCUMENTS

| | | | |
|---|---|---|---|
| 5,411,259 A | 5/1995 | Pearson | |
| 5,907,831 A | 5/1999 | Lotvin et al. | |
| 5,923,330 A | 7/1999 | Tarlton | |
| 6,009,458 A | 12/1999 | Hawkins et al. | |
| 6,119,229 A | 9/2000 | Martinez et al. | |
| 6,159,101 A | 12/2000 | Simpson | |
| 6,178,407 B1 | 1/2001 | Lotvin et al. | |
| 6,267,672 B1 | 7/2001 | Vance | |
| 6,290,566 B1 | 9/2001 | Gabai et al. | |
| 6,404,438 B1 | 6/2002 | Hatlelid | |
| 6,468,155 B1 | 10/2002 | Berlin et al. | |
| 6,476,830 B1 | 11/2002 | Farmer et al. | |

(Continued)

FOREIGN PATENT DOCUMENTS

| | | |
|---|---|---|
| CA | 2331244 A1 | 7/2001 |
| CA | 2378301 A1 | 9/2002 |

(Continued)

OTHER PUBLICATIONS

"The Sims Booklet," dated 2000.

(Continued)

*Primary Examiner* — Dmitry Suhol
*Assistant Examiner* — Jason Yen
(74) *Attorney, Agent, or Firm* — Pearne & Gordon LLP

(57) ABSTRACT

A game system that can be played on two websites. The game allows a user to play a first game on both a first website which is a website intended for the user to play the game, and also allows the user to play the game on a second website which is a social networking website. The game as played on both the first website and on the second social networking website accumulates points and rewards for a user, and the points and rewards are commonly accumulated for play on both the first website and on the second website. The game engine controlling the user playing the game on the second website comprising receiving a reward from the game on the second website that requires the user to go to the first website. This drives the user to the main version of the game.

12 Claims, 3 Drawing Sheets

(56) References Cited

U.S. PATENT DOCUMENTS

| | | |
|---|---|---|
| 6,494,762 B1 | 12/2002 | Bushmitch et al. |
| 6,519,771 B1 | 2/2003 | Zenith |
| 6,522,333 B1 | 2/2003 | Hatlelid |
| 6,595,858 B1 | 7/2003 | Tajiri et al. |
| 6,612,501 B1 | 9/2003 | Woll et al. |
| 6,616,532 B2 | 9/2003 | Albrecht |
| 6,663,105 B1 | 12/2003 | Sullivan et al. |
| 6,692,360 B2 | 2/2004 | Kusuda et al. |
| 6,722,973 B2 | 4/2004 | Akaishi |
| 6,729,884 B1 | 5/2004 | Kelton et al. |
| 6,745,236 B1 | 6/2004 | Hawkins et al. |
| 6,758,746 B1 | 7/2004 | Hunter |
| 6,773,325 B1 | 8/2004 | Mawle et al. |
| 6,773,344 B1 | 8/2004 | Gabai et al. |
| 6,910,186 B2 | 6/2005 | Kim |
| 6,918,833 B2 | 7/2005 | Emmerson et al. |
| 6,948,131 B1 | 9/2005 | Neven et al. |
| 6,951,516 B1 | 10/2005 | Eguchi et al. |
| 6,954,728 B1 | 10/2005 | Kusumoto et al. |
| 6,959,166 B1 | 10/2005 | Gabai et al. |
| 7,037,166 B2 | 5/2006 | Shrock et al. |
| 7,066,781 B2 | 6/2006 | Weston |
| 7,081,033 B1 | 7/2006 | Mawle et al. |
| 7,136,826 B2 | 11/2006 | Alsafadi et al. |
| 7,143,358 B1 | 11/2006 | Yuen |
| 7,171,154 B2 | 1/2007 | Fujisawa |
| 7,203,656 B2 | 4/2007 | Lotvin et al. |
| 7,249,139 B2 | 7/2007 | Chuah et al. |
| 7,266,522 B2 | 9/2007 | Dutta et al. |
| 7,300,344 B2 | 11/2007 | Fujioka et al. |
| 7,314,407 B1 | 1/2008 | Pearson |
| 7,425,169 B2 | 9/2008 | Ganz |
| 7,442,108 B2 | 10/2008 | Ganz |
| 7,465,212 B2 | 12/2008 | Ganz |
| 7,478,047 B2 | 1/2009 | Loyall et al. |
| 7,488,231 B2 | 2/2009 | Weston |
| 7,534,157 B2 | 5/2009 | Ganz |
| 7,568,964 B2 | 8/2009 | Ganz |
| 7,604,525 B2 | 10/2009 | Ganz |
| 7,618,303 B2 | 11/2009 | Ganz |
| 7,677,948 B2 | 3/2010 | Ganz |
| 7,742,943 B2 | 6/2010 | Postrel |
| 7,765,124 B2 | 7/2010 | Postrel |
| 7,769,630 B2 | 8/2010 | Postrel |
| 7,789,726 B2 | 9/2010 | Ganz |
| 7,792,705 B2 | 9/2010 | Bezos et al. |
| 7,846,004 B2 | 12/2010 | Ganz |
| 7,862,428 B2 | 1/2011 | Borge |
| 7,967,657 B2 | 6/2011 | Ganz |
| 8,002,605 B2 | 8/2011 | Ganz |
| 8,137,193 B1 * | 3/2012 | Kelly et al. ............... 463/31 |
| 8,292,688 B2 | 10/2012 | Ganz |
| 8,317,566 B2 | 11/2012 | Ganz |
| 2002/0049847 A1 | 4/2002 | McArdle et al. |
| 2002/0100040 A1 | 7/2002 | Bull |
| 2002/0107073 A1 | 8/2002 | Binney |
| 2002/0119810 A1 | 8/2002 | Takatsuka et al. |
| 2002/0160835 A1 | 10/2002 | Fujioka et al. |
| 2002/0165777 A1 | 11/2002 | Lotvin et al. |
| 2002/0183119 A1 | 12/2002 | Fessler |
| 2002/0198781 A1 | 12/2002 | Cobley |
| 2003/0126031 A1 | 7/2003 | Asami |
| 2004/0043806 A1 | 3/2004 | Kirby et al. |
| 2004/0053690 A1 | 3/2004 | Fogel et al. |
| 2004/0093266 A1 | 5/2004 | Dohring |
| 2004/0143852 A1 | 7/2004 | Meyers |
| 2004/0193489 A1 | 9/2004 | Boyd et al. |
| 2004/0225605 A1 | 11/2004 | Rowe |
| 2004/0242326 A1 | 12/2004 | Fujisawa et al. |
| 2005/0059483 A1 | 3/2005 | Borge |
| 2005/0137015 A1 | 6/2005 | Rogers et al. |
| 2005/0177428 A1 | 8/2005 | Ganz |
| 2005/0250415 A1 | 11/2005 | Barthold |
| 2005/0250416 A1 | 11/2005 | Barthold |
| 2006/0093142 A1 | 5/2006 | Schneier et al. |
| 2006/0123127 A1 | 6/2006 | Littlefield |
| 2006/0293103 A1 | 12/2006 | Mendelsohn |
| 2007/0073582 A1 | 3/2007 | Jung et al. |
| 2007/0082738 A1 | 4/2007 | Fickie et al. |
| 2007/0099685 A1 | 5/2007 | VanLuchene |
| 2007/0112624 A1 | 5/2007 | Jung et al. |
| 2007/0121843 A1 | 5/2007 | Atazky et al. |
| 2007/0129998 A1 | 6/2007 | Postrel |
| 2007/0130001 A1 | 6/2007 | Jung et al. |
| 2007/0174304 A1 | 7/2007 | Shrufi et al. |
| 2008/0039166 A1 | 2/2008 | Harris et al. |
| 2008/0040428 A1 | 2/2008 | Wei et al. |
| 2008/0070690 A1 | 3/2008 | Van Luchene et al. |
| 2008/0090659 A1 * | 4/2008 | Aguilar et al. ............... 463/42 |
| 2008/0221998 A1 | 9/2008 | Mendelsohn et al. |
| 2008/0250332 A1 | 10/2008 | Farrell et al. |
| 2008/0280684 A1 | 11/2008 | McBride et al. |
| 2010/0174593 A1 * | 7/2010 | Cao et al. ............... 705/14.12 |
| 2010/0248818 A1 * | 9/2010 | Aoki et al. ............... 463/25 |
| 2010/0317442 A1 * | 12/2010 | Thomas et al. ............... 463/42 |
| 2012/0202587 A1 * | 8/2012 | Allen et al. ............... 463/25 |
| 2012/0264511 A1 * | 10/2012 | Marsland et al. ............... 463/31 |
| 2013/0123009 A1 * | 5/2013 | Maharbiz et al. ............... 463/31 |

FOREIGN PATENT DOCUMENTS

| | | |
|---|---|---|
| CA | 2552367 A1 | 7/2005 |
| CA | 2552008 A1 | 1/2008 |
| DE | 10304779 A1 | 7/2003 |
| EP | 1217560 A1 | 6/2002 |
| EP | 1382372 A1 | 1/2004 |
| GB | 2365364 | 2/2002 |
| JP | 2002063092 | 2/2002 |
| WO | 01/69829 A2 | 9/2001 |
| WO | 0227591 A1 | 4/2002 |
| WO | 02/054327 A1 | 7/2002 |
| WO | 2008067668 A1 | 6/2008 |

OTHER PUBLICATIONS

Neopian Hospital, retrieved Mar. 24, 2010.
Neopets—Archeology, retrieved Mar. 25, 2010.
The Helpful Neopian, retrieved Mar. 25, 2010.
Search Report for PCT/CA2008/002016, corresponding case of GANZ-43019.
Search Report for AU 2008246242, corresponding case of GANZ-43019.
Search Report for CN-2008101750866, English translation, dated Jan. 24, 2011.
Wayback Machine Internet archive from original website Dec. 10, 2004; http://web.archive.org/web/20041210035624/http://distributedcomputing.info/ap-charity.html.
Erica Naone, "Moving Freely Between Virtual Worlds", Technology Review (MIT, Oct. 29, 2007).
Daniel Terdiman, Tech Titans Seek Virtual-World Interoperability: CNET News (Oct. 12, 2007).
Mark Ward, :Virtual Cash Exchange Goes Live BBC News Online (Jan. 7, 2004).
U.S. Appl. No. 11/942,318, filed Nov. 19, 2007.
U.S. Appl. No. 11/942,301, filed Nov. 19, 2007.
Grace, "Web Site Tycoon's Next Goal: Sixth Grade"; Woonsocket Call, Jun. 19, 2002.
http://web.archive.org.web.20031202190119/www.monopets.com/, Dec. 2, 2003.
Lehdonvirta, "Real Money Trade of Virtual Assets: Ten Different User Perceptions"; Helsinki Institute for Information Technology, 2005.
Spence, "Neopet Nation"; Toronto Star, Mar. 13, 2003.

* cited by examiner

INCENTIVIZING PLAYING BETWEEN WEBSITES

This application claims priority from provisional application No. 61/600,130, filed Feb. 17, 2012, the entire contents of which are herewith Incorporated by reference.

BACKGROUND

Our U.S. Pat. No. 7,425,169, filed Dec. 30, 2004 discusses a system of interacting with a virtual representation of a real world product. According to this system, referring to FIG. 1, a user can buy a toy or other real world product such as 100, which is associated with a special code 105. The toy 100 exists in the real world, and the code 105 forms a key to a virtual world 110. The user enters the code 105 on a website and enters the virtual world 110.

The virtual world 110 provides activities and views with which the user can interact. The virtual world 110, as part of the interaction, provides a virtual replica 115, which is a representation of the actual toy 100. Users can carry out various activities in the virtual world 110 on the website with their virtual replica 115 of the toy 100 to navigate through the virtual world. For example, the user can establish a virtual house with rooms, furniture, appliances, accessories, clothing, and other things for their virtual replica 115. The user can also carry out activities to earn virtual currency or cash, and purchase virtual items using that currency or cash.

Our co-pending application Ser. No. 11/942,301, filed Nov. 19, 2007, describes transfers of rewards between websites. The disclosures of application Ser. No. 11/942,301 and U.S. Pat. No. 7,421,569 are hereby incorporated by reference herein in their entireties.

SUMMARY

The present application describes techniques of interacting with virtual characters on a remote website version of a virtual world site. Actions that are carried out in a game on the remote version of the site, to drive the user to the main version of the site. According to one embodiment, the interaction with characters may include playing a game on the remote website. In another embodiment, interaction with the characters may include interacting with a virtual world and virtual characters that are hosted on the main website, and where at least some part of that virtual world is also present on the remote website.

According to an embodiment, a user takes an action on a website; e.g., play a game; do a mission; or something else. This can be on a remote website such as Facebook, or on another platform (iPad tablet for example). The user gets something of value on another website other than the website on which the user took the action. The thing of value could be credit, virtual currency, virtual item, coupon in the real world, or code for any of these. That thing of value can allow the user to use it themself (deposit); (ii) send it to someone else; (iii) send it but dividing it amongst others. Having it sent or deposited could be automatic, or the user could have a choice of where to use it or send it. It could be sent to the user's account or another person's or persons' account or accounts, on the same site or on another site or sites.

DETAILED DESCRIPTION

Figure 1:
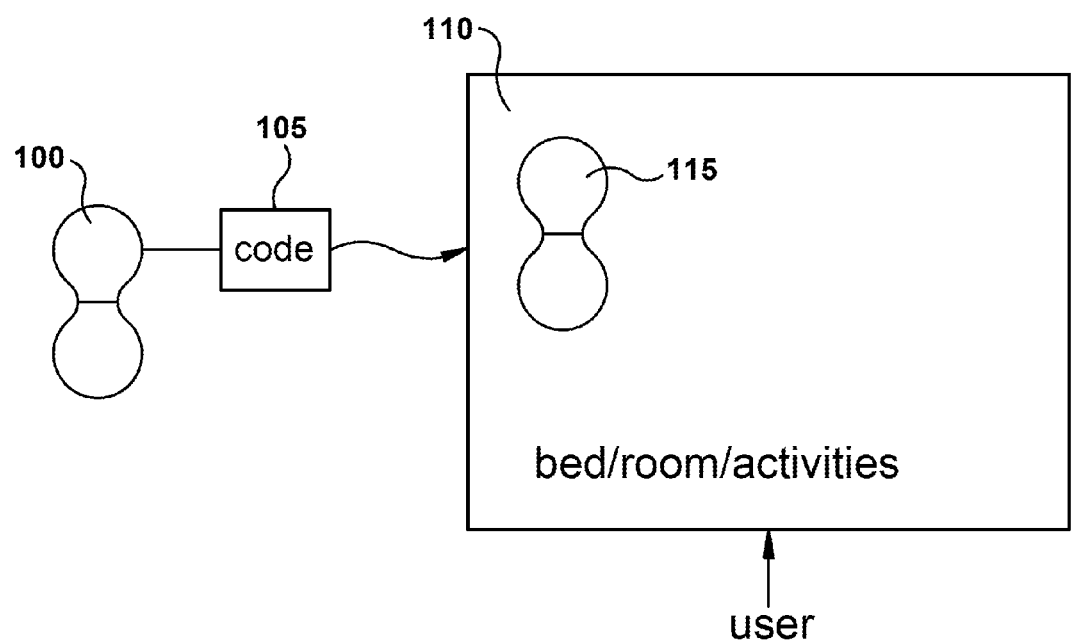
FIG. 1 shows an embodiment of using a code for registering an item on a virtual world site.

The present application describes additional aspects, actions and activities and additional structure, for interacting with and/or getting to a website of the type described in our co-pending application, and as shown generally in FIG. 1. It should be understood, however, that the aspects described herein are not limited to use with the system described in FIG. 1. These aspects can be used with other kinds of websites, for example, any website that allows user interaction can be used with a computer-based activity. An embodiment describes new operations using the website illustrated in FIG. 1.

In the embodiment, and in websites such as the Webkinz® website, users carry out activities to earn virtual currency or cash that is usable on the website. The virtual cash can be used to purchase items that are usable on the website, e.g., virtual food, furniture, clothing or other virtual items.

Our U.S. Pat. No. 8,088,002, issued Jan. 3, 2012 describes how different virtual worlds and websites may use different forms of virtual cash or currency. For example, one website called "Ganz World" may accept one form of virtual cash and another website called Webkinz® World may accept a different form of cash.

In addition, however, advertising sites such as Facebook® and other social networking sites may invite a user to play a version of the game or other activity on the social networking site. For example, even though games like Farmville® have their own dedicated website, users may be able to play a version of Farmville® on other sites, such as social networking sites, e.g., the Facebook® site.

There may be certain advantages in playing the game of Farmville® on the social networking site. For example, in Farmville®, a user might be able to harvest virtual crops such as virtual carrots. The user can then give those virtual crops to friends in the virtual world hosted within the Farmville® website. This is often done in the hope that the friends will give the user something in return. This becomes a form of trading where users give their friends things on the website, with the understanding or expectation that the friends will give the user things in return, either right away or eventually.

However, there are other reasons to play games like Farmville on the remote version of the website. Users are often visiting that website (e.g., Facebook®) in order to carry out some other activities such as social networking.

Figure 2:
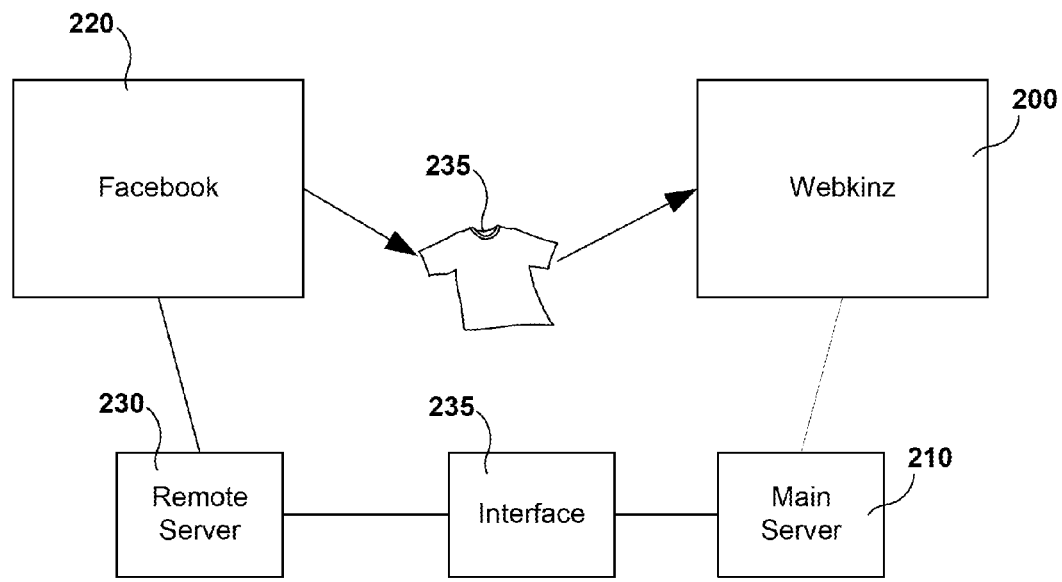
FIG. 2 shows a system according to an exemplary embodiment.

According to an embodiment, the same activities can be carried out in both the main website version of the game shown as 200 in FIG. 2, and within the remote website version of the game shown as 220 in FIG. 2. The Webkinz® website shown as 200 in FIG. 2 may have a main Webkinz® server 210 driving the Webkinz® website. The server may be a group of servers such as a farm of servers or other cluster of servers that interconnect to carry out the functions described herein.

The Facebook® game 220 in FIG. 2 may have a remote server 230 which may be the Facebook® server or some part of the main server 210.

An embodiment described herein describes the Facebook® version of the game as being a "remote" website version of the game. Alternatively, in addition to Facebook®, it is contemplated that a remote website version of the game can be a game played on another website or on another suitable platform. For example, an iPad® version of the game can be the remote website version of the game as it is described herein.

Moreover, the techniques described herein need not be carried out as part of the game per se, but can be carried out as any interaction between any two websites even if neither of those websites involves a game. The embodiment described below refers to a "game" but it should be understood that this embodiment can be carried out on non-game websites also.

An interface 235 may allow communication between the remote server hosting the Facebook® version of the game 220, and the main server hosting the Webkinz® version of the game at 200. Alternatively, it is contemplated that both websites 200 and 220 could be hosted on the same physical server or cluster, despite being separate websites.

In the specific embodiment herein, the activity can be a game and the remote website version of the game can be a Facebook® version of the game, which may have reduced capabilities, for example.

One example of the games with different versions is in a virtual world or game such as Webkinz® or Tail Towns™. These games host a virtual world in which a user can receive one or multiple different virtual items in the virtual world as rewards or prizes from the game. The user can receive these items in both the main website version of the virtual world and in the remote website version of the virtual world.

For example when the user takes some action in the Facebook® version, 220, the user may be rewarded with a virtual item in the Facebook® version 220, for example a red shirt. The red shirt may be an item which is exclusive to the Facebook® version 220. However, the indication that the user has received a red shirt 220 is communicated by the remote server 230 via the interface 235 to the main server 210, that runs the main (Webkinz®) website 200.

Figure 3:
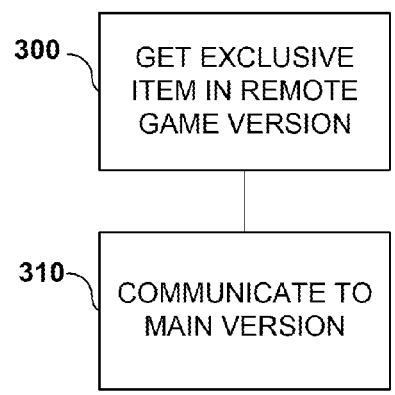
FIG. 3 shows a system according to another exemplary embodiment.

In an embodiment, the user can only get the red shirt, shown as 250, in the remote version of the game, as shown in 300 in FIG. 3, where the exclusiveness of the "exclusive item" means that it can only be obtained in the remote website game 220. However, the game communicates information indicative of the user having received that red shirt, to the main version of the game shown as 251 and as 310 in FIG. 3. The user in one embodiment, can only use (e.g., wear) the red shirt in the main version 200 of the game. Therefore, this operation encourages the users to use the remote version of the game, but in so doing, the game drives the users to the main version of the game where they can use the shirt 250 that they received on the remote version of the game 220.

In one embodiment, the users can only use other exclusive virtual items in a virtual world that is hosted on the main website and can only get those other exclusive items by actions (e.g., playing games) on the remote website. Hence, by providing prizes that can only be used on the main website, users are incentivized to go to the main website through their play on the remote website.

Again, more generally, this embodiment can be used on any website or suitable platform to provide something that is of value on another website. According to the first embodiment disclosed above, the user does something in the remote version of the game and gets something that is of value on the main version of the game.

Figure 4:
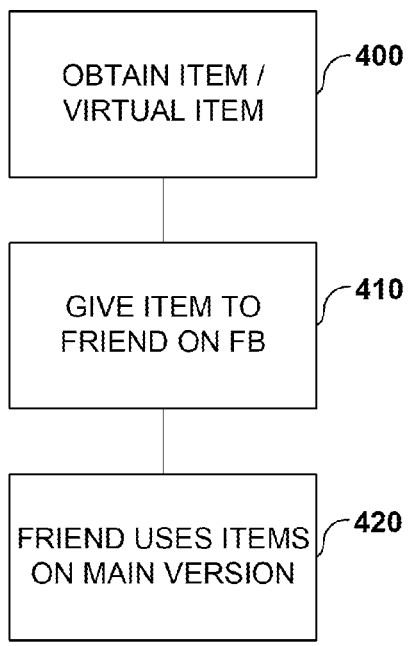
FIG. 4 shows a system according to another exemplary embodiment.
Figure 5:
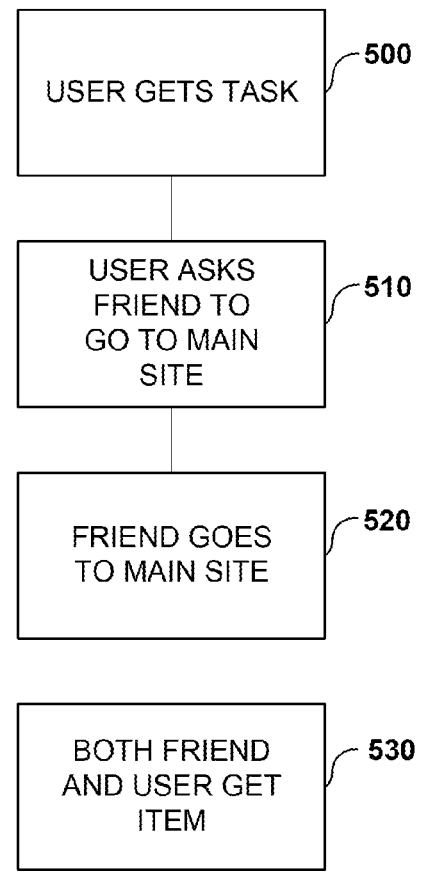
FIG. 5 shows a system according to another exemplary embodiment.

Another embodiment involves sending a user something (e.g., a virtual item) from the remote website that they can use on the main site. The item is sent to the user from actions taking place on the remote website. In this embodiment, the remote website may be a social network which allows users to have friends, such as Facebook®. Users can have Facebook® friends, to whom they communicate. Users may obtain items either from Facebook® 220 or from an "estore" associated with the Facebook® site 220. In one embodiment, as shown in FIG. 4, the user may also obtain items from the main site 200. The items are obtained at 400. These items may be credits, or a specific item, or a code that can be registered to obtain a virtual representation of an item.

410 shows giving the item to a friend on the remote version of the website 220, as a gift given on the remote version of the website 220. In an embodiment, however, even though these items are given on the remote version of the website 220, they can only be used on the main version of the website 200.

420 shows the user using these items on the main website version 200. Therefore, these are given as a gift to a friend on Facebook® 220, even though the items can only be used on the main version of the site 200. According to another embodiment, the items that are given can be kept on the remote site (here Facebook®) or divided among other people on the multiple sites.

Again, this forms another incentive that encourages people to interact with the game on sites like Facebook® but drives them to the main sites, like the Webkinz® website. In this embodiment, the user gets a code that they can use on the other website.

Another embodiment describes yet another incentive that encourages people to move to the main version of the website by advertising on the remote version of the website to attempt to draw new users into the main version of the website.

According to another embodiment, the user receives a task at 500 that requires the user to get a friend to do something on the site. According to this embodiment, the task requires that the user go on the Facebook® site 220 and invite one of their friends to go to the main site 200. The friend may be given a code to use on the main site 200 when they get there or they may simply be told to enter their friend's name on the main site 200.

When the friend does in fact go to the main site 200 at 520, both the friend and the user receive an item that is usable on the site 200 at 530. For example, the items might be a coupon for another site such as an e-commerce site, or a coupon for a real bricks and mortar store. Other options include the item being virtual cash; and include only the friend or only the user receiving the item.

In an embodiment, users go on to the Facebook® site and tell a friend to go to the Webkinz® site through a Facebook® operation such as a Facebook® chat or Facebook® message or as part of a Facebook® friend request for a new friend. When the user tells the friend to go to the Webkinz® site, the user gets a gift for sending the friend to the Webkinz® site, but only if the friend actually goes to the Webkinz® site. The advantage of this is that it encourages the sender of the request to follow-up with the friend to get them to go on the Webkinz® site, thereby encouraging the user's friends to actually go on the Webkinz® site. Therefore, in this embodiment, by incentivizing someone to go to a specific website, the user who did the incentivizing receives back something of value. The thing they receive back can be a virtual item or a real item, such as a discount coupon usable in the real world. Other things that can be received include a code and/or virtual currency.

According to another embodiment, the same techniques can be used within the same website, whereby instead of requiring the item to be obtained on the remote version of the website, all of these techniques are used on a single website for different users on the single website.

This technique can be used, for example, for someone to obtain rewards and items that can be used on other websites.

For example, by playing on the remote version of the website, the user can provide rewards to someone else.

Again, this embodiment need not be used as part of a game. For example, the remote version of the website may have advertisements from T.G.I. Friday's®. The website may tell a user that they can send their friends to another website, and in that other website, their friend can get a coupon. The user tells their friends to go to moshimonsters.com, and enter the code freegiftfromuserx. When the friend enters that code, the friend gets a discount coupon, but the user who provided the referral code also gets a discount. In this way, additional interest in the advertisement is spurred on by the interactivity of the website.

If T.G.I. Friday's® wants to advertise a special deal, that deal can be advertised for example on the Webkinz® website. As part of that deal, each user gets special codes that they can give to their friends for discounts. When the friends pick up the discount codes, the user who gave the friend a discount code also receives an item: either another discount or something else they can use on the Webkinz® website. This increases the interest in the advertisement, and encourages users to view those advertisements and to get their friends to view and interact with the contents of those advertisements.

A specific example of the operations described herein is Webkinz Friends site, meant for adults, that is hosted on Facebook. On this site, the users carry out missions and win prizes. Those prizes can be used on Webkinz.com or on some other person's account on Webkinz.com. They could be used on the main Webkinz Friends site. The choice of where they are used is not necessarily automatic—a user can have the choice to identify a recipient.

In another embodiment, the user can receive the thing of value either by mail or on the remote site (here Facebook®). The user can tell another person that they will receive that item of value, e.g. by telling another person to go to the website to pick up a code. They can tell the user to go to another site to get a code usable at a bricks and mortar store, TGI Friday's® in the above example. People can go to either a main site, such as the center of the universe site, to pick up a code to send to their friends to see an advertisement.

According to another embodiment, any of the above embodiments are used along with a product that has a code associated with it, and that code creates a virtual representation of the product when it is entered onto the site. In this product/code/virtual representation embodiment, there is a special synergy when a user gets the product.

While the above has described this as being used as part of a game, this can also be used in the context of advertising of products. In this case, ads become more than an impression on a website, but rather become an engaging experience. In one embodiment, the ads can become an interactive experience.

The subject matter described as the above embodiments provide special advantages when used along with a virtual world site where items can be interacted with on the site, and may also provide special advantages to a site like the Webkinz® site where physical products are purchased in the real world each of those purchased products have a code that is uniquely indicative of that product, and entering the code causes the virtual version of the product to be registered.

Moreover, the above has described uses of this system in a virtual world context; however it should be understood that this can also be used in other kind of websites, e.g., newsfeed websites, general informational websites, social networking websites, and others.

The general structure and techniques, and more specific embodiments which can be used to effect different ways of carrying out the more general goals are described herein.

Although only a few embodiments have been disclosed in detail above, other embodiments are possible and the inventor intends these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other items besides those specifically discussed herein can be used according to the embodiments described.

Also, the inventor intends that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The computer may be an Intel (e.g., Pentium or Core 2 duo) or AMD based computer, running Windows XP or Linux, or may be a Macintosh computer. The computer may also be a handheld computer, such as a PDA, cellphone, or laptop.

The programs may be written in C or Python, or Java, Brew or any other programming language. The programs may be resident on a storage medium, e.g., magnetic or optical, e.g. the computer hard drive, a removable disk or media such as a memory stick or SD media, wired or wireless network based or Bluetooth based Network Attached Storage (NAS), or other removable medium or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be

What is claimed is:

1. A method, comprising: a user from a computer playing a first game on both a first website and on a second website, where the first website is a main version of the first game plays a main version of the first game, and from the second website plays a remote version of the first game where a focus of the second website is to carry out other action other than gameplay, and where the first game has more capabilities when played on the first website and fewer capabilities when played on the second website and where rewards from both the first website and from the second website are commonly accumulated, wherein the other action on the second website comprises receiving a reward from playing on the second website that can only be used on the first website and cannot be used on the second website; the user playing the first game on the second website comprising receiving a reward on the second website that requires the user to go to the first website.

2. The method as in claim 1, wherein the remote version of the first game on the second website is a social networking website.

3. The method as in claim 1, wherein the reward can only be received by operations on the second website, and cannot be received by any operations on the first website.

4. The method as in claim 1, wherein the reward is virtual clothing to be worn by a virtual user on the website.

5. The method as in claim 1, wherein the other action on the second website comprises receiving a task by playing on the second website that can only be carried out by going to the first website.

6. The method as in claim 5, wherein the task provides a prize for a user who carries out the task.

7. A system of playing a game on multiple websites, comprising: a game engine, which allows a user to play a first game on both a first website which is a website intended for the user to play the first game, and also allows the user to play the first game on a second website which is a social networking website, where the first game played on both the first website and on the second social networking website accumulates points and rewards for a user, and the points and rewards are commonly accumulated for play on both the first website and on the second website, wherein the reward on the second website can only be used on the first website and cannot be used on the second website; the game engine controlling the user playing the first game on the second website comprising receiving a reward from the game on the second website that requires the user to go to the first website.

8. The system as in claim 7, wherein the second website is a social networking website.

9. The system as in claim 7, wherein the reward can only be received by operations on the second website, and cannot be received by any operations on the first website.

10. The system as in claim 7, wherein the reward is virtual clothing to be worn by a virtual user on the website.

11. The system as in claim 7, wherein the action on the second website comprises receiving a task by playing on the second website that can only be carried out by going to the first website.

12. The system as in claim 11, wherein the task provides a prize for a user who carries out the task.

* * * * *

UNITED STATES PATENT AND TRADEMARK OFFICE
CERTIFICATE OF CORRECTION

| | |
|---|---|
| PATENT NO. | : 8,721,456 B2 |
| APPLICATION NO. | : 13/768421 |
| DATED | : May 13, 2014 |
| INVENTOR(S) | : Howard Ganz and Karl Joseph Borst |

It is certified that error appears in the above-identified patent and that said Letters Patent is hereby corrected as shown below:

On the Title page, column 1, (60) "Provisional application No. 61/600,130, filed on Feb. 17, 2013" should read --Provisional application No. 61/600,130, filed on Feb. 17, 2012--

In the Specification, column 1, line 10, the patent number "7,425,169" should read --7,421,569--

Signed and Sealed this
Fifth Day of April, 2016

Michelle K. Lee
*Director of the United States Patent and Trademark Office*